United States Patent
Balakrishnan et al.

(10) Patent No.: US 9,742,738 B2
(45) Date of Patent: Aug. 22, 2017

(54) METHOD AND APPARATUS FOR ENFORCING STORAGE ENCRYPTION FOR DATA STORED IN A CLOUD

(71) Applicants: Raja Suresh Krishna Balakrishnan, San Jose, CA (US); Vineet Bhan, Santa Clara, CA (US); Rahul Gopi, Milpitas, CA (US)

(72) Inventors: Raja Suresh Krishna Balakrishnan, San Jose, CA (US); Vineet Bhan, Santa Clara, CA (US); Rahul Gopi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 14/307,418

(22) Filed: Jun. 17, 2014

(65) Prior Publication Data

US 2015/0365382 A1 Dec. 17, 2015

(51) Int. Cl.
*H04L 29/06* (2006.01)
*H04L 29/08* (2006.01)
*G06F 21/62* (2013.01)
*H04W 4/00* (2009.01)
*H04W 4/14* (2009.01)

(52) U.S. Cl.
CPC ...... *H04L 63/0428* (2013.01); *G06F 21/6218* (2013.01); *H04L 63/0471* (2013.01); *H04L 67/10* (2013.01); *H04L 67/1097* (2013.01); *H04W 4/003* (2013.01); *H04W 4/14* (2013.01)

(58) Field of Classification Search
None
See application file for complete search history.

(56) References Cited

U.S. PATENT DOCUMENTS 7,124,301 B1 * 10/2006 Uchida .................. G06F 21/31
                                                        713/189
8,762,343 B2 * 6/2014 Grube .................... G06F 21/64
                                                        707/652

(Continued)

OTHER PUBLICATIONS

Stephan Groa et al.: "Towards User Centric Data Governance and Control in the Cloud"; Open Problems in Network Security, Jan. 1, 2012; ISBN: 978-3-642-37584-5; Berlin, Germany.

(Continued)

*Primary Examiner* — Maung Lwin
(74) *Attorney, Agent, or Firm* — P. Su

(57) ABSTRACT

In one embodiment, a method includes providing a request to store at least a first piece of data. The request to store the first piece of data is a request to store the first piece of data in a first encrypted form on a cloud associated with the cloud application provider. The method also includes determining whether the cloud application provider is capable of encrypting the first piece of data, and providing the first piece of data to the cloud application provider if it is determined that the cloud application provider is capable of encrypting the first piece of data. If it is determined that the cloud application provider is not capable of encrypting the first piece of data, the method further includes encrypting the first piece of data to create the first encrypted form and providing the first encrypted form to the cloud application provider.

20 Claims, 12 Drawing Sheets

(56) References Cited

U.S. PATENT DOCUMENTS

| | | | |
|---|---|---|---|
| 8,799,322 B2 * | 8/2014 | deMilo | G06F 17/30082 707/791 |
| 2002/0184495 A1 * | 12/2002 | Torii | G06F 21/608 713/160 |
| 2005/0071337 A1 * | 3/2005 | Baranczyk | G06F 17/30477 |
| 2007/0101123 A1 * | 5/2007 | Kollmyer | H04L 29/06027 713/154 |
| 2008/0025516 A1 * | 1/2008 | Masuhiro | H04L 63/0428 380/279 |
| 2008/0082835 A1 * | 4/2008 | Asher | G06F 21/78 713/193 |
| 2008/0126813 A1 * | 5/2008 | Kawakami | G06F 21/72 713/193 |
| 2008/0247545 A1 * | 10/2008 | Teruyama | H04L 9/0841 380/255 |
| 2008/0320319 A1 * | 12/2008 | Muller | G06F 21/6209 713/193 |
| 2009/0271633 A1 * | 10/2009 | Cohen | G06F 21/34 713/185 |
| 2010/0217612 A1 * | 8/2010 | Apacible | G06Q 10/06 705/1.1 |
| 2010/0332401 A1 | 12/2010 | Prahlad et al. | |
| 2010/0332479 A1 * | 12/2010 | Prahlad | G06F 17/3002 707/741 |
| 2010/0333116 A1 | 12/2010 | Prahlad et al. | |
| 2011/0022642 A1 | 1/2011 | Demilo et al. | |
| 2011/0173438 A1 * | 7/2011 | Matzkel | H04L 9/0833 713/150 |
| 2011/0202790 A1 * | 8/2011 | Rambo | G06F 3/0605 714/6.12 |
| 2011/0264907 A1 | 10/2011 | Betz et al. | |
| 2012/0179802 A1 * | 7/2012 | Narasimhan | H04L 41/046 709/223 |
| 2012/0179904 A1 * | 7/2012 | Dunn | G06F 21/575 713/155 |
| 2013/0111220 A1 * | 5/2013 | Friedlander | H04L 63/0428 713/193 |
| 2013/0125247 A1 * | 5/2013 | Sprague | G06F 21/60 726/28 |
| 2013/0191650 A1 * | 7/2013 | Balakrishnan | G06F 21/6227 713/190 |
| 2014/0101775 A1 | 4/2014 | Cheung et al. | |
| 2014/0122867 A1 | 5/2014 | Shrinivasan et al. | |
| 2014/0359285 A1 * | 12/2014 | Tanik | G06F 21/79 713/165 |
| 2015/0039887 A1 * | 2/2015 | Kahol | G06F 21/6227 713/165 |
| 2015/0095352 A1 * | 4/2015 | Lacey | G06F 17/30011 707/752 |

OTHER PUBLICATIONS

Chen Feng et al.: "Client-aware cloud storage"; 2014 30th Symposium on Mass Storage Systems and Technologies, IEEE, Jun. 2, 2014, pp. 1-12; DOI: 10.1109/MSST.2014.6855554.

Ciphercloud; "The 10-Minute Guide to Cloud Encryption Gateways"; leadinsight.com/~/media/39D8535A32B048EA807D8C1FE5D60E62.pdf; 2013; San Jose, California.

* cited by examiner

METHOD AND APPARATUS FOR ENFORCING STORAGE ENCRYPTION FOR DATA STORED IN A CLOUD

TECHNICAL FIELD

The disclosure relates generally to providing security in networks. More particularly, the disclosure relates to ensuring that sensitive data is encrypted prior to being stored in a cloud.

BACKGROUND

Data and applications used by an enterprise often reside on a cloud that is outside of the domain of the enterprise, as for example on third-party servers. When an enterprise stores its data and applications on a cloud, the enterprise is generally unable to control whether the data is stored securely. While automatically encrypting all data for storage on a cloud may be effective in ensuring that the data is stored securely on the cloud, encrypting all data is typically time-consuming and expensive.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
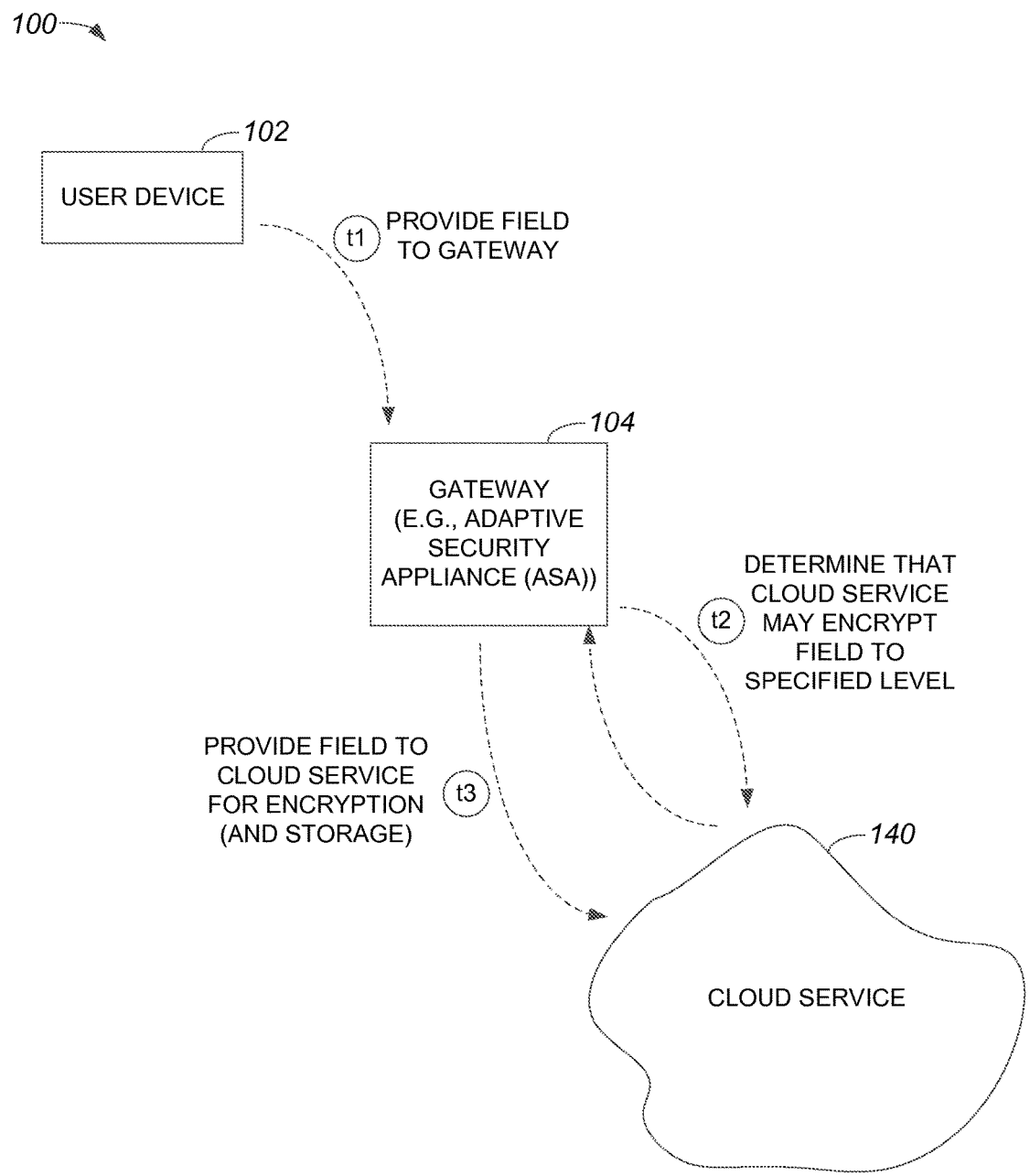
FIG. 1A is a diagrammatic representation of a network in which a cloud service is configured to encrypt individual fields, e.g., units of data or pieces of information, provided by a gateway to a specified level in accordance with an embodiment.

According to one aspect, a method includes providing a request to store at least a first piece of data, the request being provided to a cloud application provider, wherein the request to store the at least first piece of data is a request to store the at least first piece of data in a first encrypted form on a cloud associated with the cloud application provider. The method also includes determining whether the cloud application provider is capable of encrypting the at least first piece of data, and providing the at least first piece of data to the cloud application provider if it is determined that the cloud application provider is capable of encrypting the at least first piece of data. If it is determined that the cloud application provider is not capable of encrypting the at least first piece of data, the method further includes encrypting the at least first piece of data to create the first encrypted form and providing the first encrypted form to the cloud application provider.

Description

Enterprises often stores data and applications on a cloud, or on servers associated with the cloud. An enterprise is generally unable to control whether data is stored securely in a cloud. Automatically encrypting all data that is to be stored on a cloud may be effective in ensuring that the data is stored securely on the cloud. However, encrypting all data that is to be stored on a cloud may be time-consuming and expensive.

Dynamically negotiating storage encryption capabilities between a gateway, i.e., a sending gateway, and a cloud service associated with a cloud allows an intelligent decision to be made as to whether the gateway will encrypt data for storage or whether the cloud service will encrypt data for storage. In addition, a gateway may negotiate with a cloud service with regards to each separate piece of data in a set of data. As such, for each sensitive piece of data in a set of data, e.g., for each sensitive field in a form that includes multiple fields, it may be determined whether a cloud service is capable of encrypting the sensitive piece of data for storage.

An administrator of an enterprise may enforce security policies for the enterprise by effectively specifying a desired encryption level for particular types of information, e.g., particular fields associated with a form. Such security policies may be used to determine whether a cloud service has the capability to encrypt a particular piece of data or a particular field for storage, or whether the particular piece of data or the particular field is to be encrypted for storage by a gateway.

The ability for a gateway, e.g., a gateway that includes an application security appliance, to encrypt data for storage allows the security of the data to effectively be ensured when a cloud service responsible for storing the data does not have the capability to encrypt the data for storage. As will be appreciated by those skilled in the art, the ability for a cloud to encrypt data allows key exchange complexities to be substantially reduced and effectively offloads computational operations associated with data encryption from a gateway to the cloud.

When a user provides a set of information, e.g., information associated with a web form, some portions of the information may be classified as sensitive while other portions of the information may be classified as not sensitive. By encrypting the sensitive portions of information for storage on a cloud, while allowing the information that is not sensitive to be stored without encryption, the security of the sensitive information may be substantially ensured without incurring costs associated with encrypting information that is not sensitive. In one embodiment, the sensitive portions of information may be encrypted at different levels of security such that one sensitive portion may be encrypted at a first level of security and another sensitive portion may be encrypted at a second level of security. That is, appropriate levels of encryption may be applied to different portions of information based upon the sensitivity of the different portions of information.

A gateway may negotiate with a cloud service to determine whether the gateway or the cloud service is to encrypt information for storage. Referring initially to FIG. 1A, an overall network in which a cloud service, e.g., a cloud application provider associated with a cloud or the Internet, is configured to individually encrypt pieces of data or information provided by a gateway at a specified level will be described in accordance with an embodiment. An overall network 100 includes a user device 102, a gateway 104, and a cloud service 140. User device 102 may be any suitable device used by a user to provide information to gateway 104. For example, user device 102 may be a computer, a tablet, and/or a phone that may accept input from a user and provide that input to gateway 104. Gateway 104 may be a node in a network on which an adaptive security appliance runs. In one embodiment, an adaptive security appliance is a network element arranged to protect networks and/or data centers, and provides firewall and/or security functionality. In general, gateway 104 facilitates the transfer of information between user device 102 and cloud service 140. Gateway 104 may be an enterprise gateway. Typically, user device 102 and gateway 104 may be part of an enterprise. As will be appreciated by those skilled in the art, cloud service 140 is typically associated with a cloud and is arranged to facilitate the storage of information within the cloud.

At a time t1, user device 102 provides a piece of data to gateway 104. The data may be provided to gateway 104 using wireless connections included in network 100, although it should be appreciated that the data may instead be provided to gateway 104 through one or more wired links. The piece of data may be, in one embodiment, a field that is part of a set of fields, e.g., a field that is included in a form filled out or otherwise populated by a user through the use of user device 102. A field may include one or more bits.

In the described embodiment, the field is sensitive, or contains information that is to be encrypted for storage. Sensitive information may generally be confidential, classified, secret, and/or restricted information. For example, the social security number of an individual may be considered to be sensitive. Upon obtaining the field from user device 102, gateway 104 exchanges information with cloud service 140 at a time t2, and determines that cloud service 140 is able to encrypt the field to a specified level. Generally, gateway 104 is arranged to determine whether cloud service 140 is to encrypt the field, or whether gateway 104 is to encrypt the field. At a time t3, because gateway 104 has been determined to be able to encrypt the field, gateway 104 provides the field to cloud service 140 for encryption, as well as storage in the cloud.

Figure 1B:
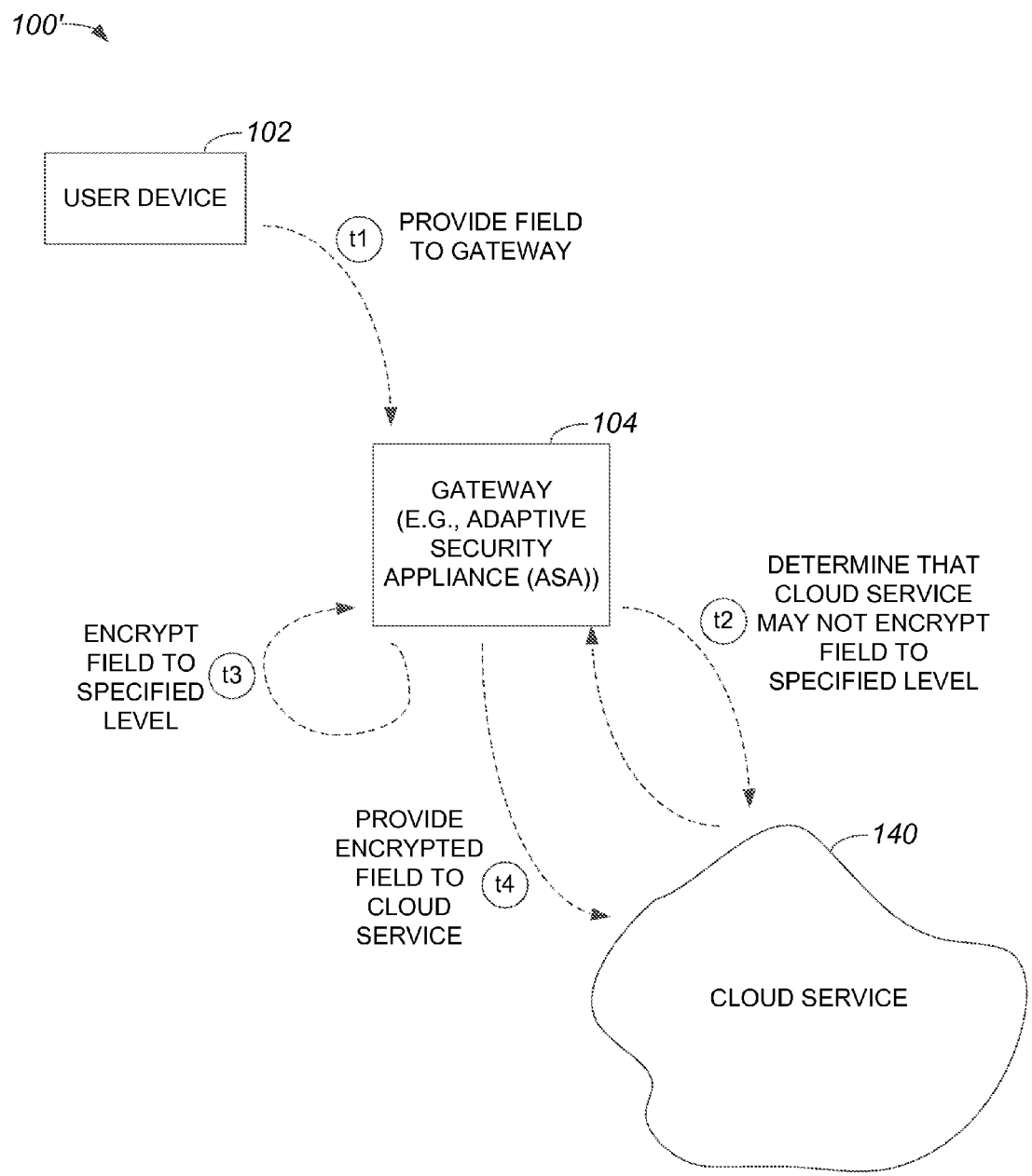
FIG. 1B is a diagrammatic representation of a network in which a gateway encrypts sensitive fields prior to providing the encrypted sensitive fields to a cloud service for storage in accordance with an embodiment.
Figure 2A:
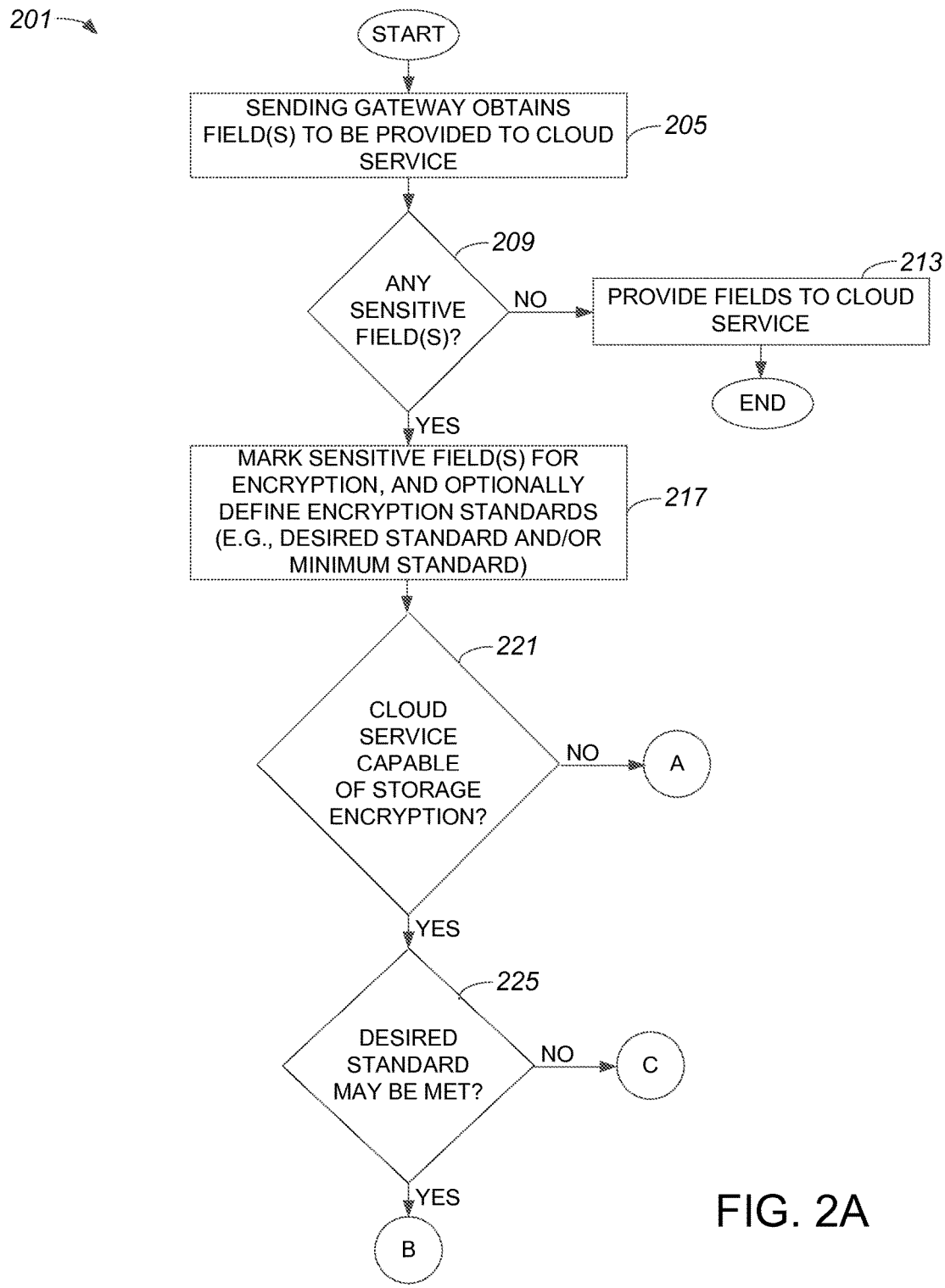
FIGS. 2A-D are a process flow diagram which illustrates a method of causing fields obtained by a gateway to be stored by a cloud service in accordance with an embodiment.
Figure 2B:
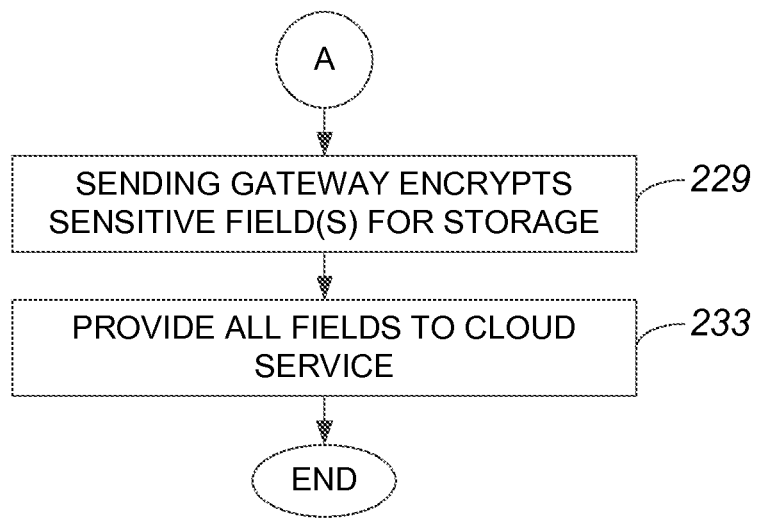
Figure 2C:
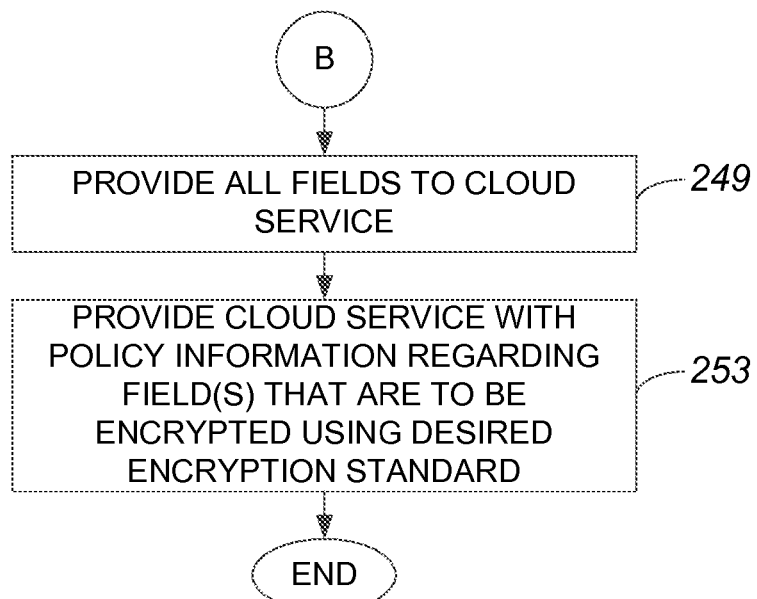
Figure 2D:
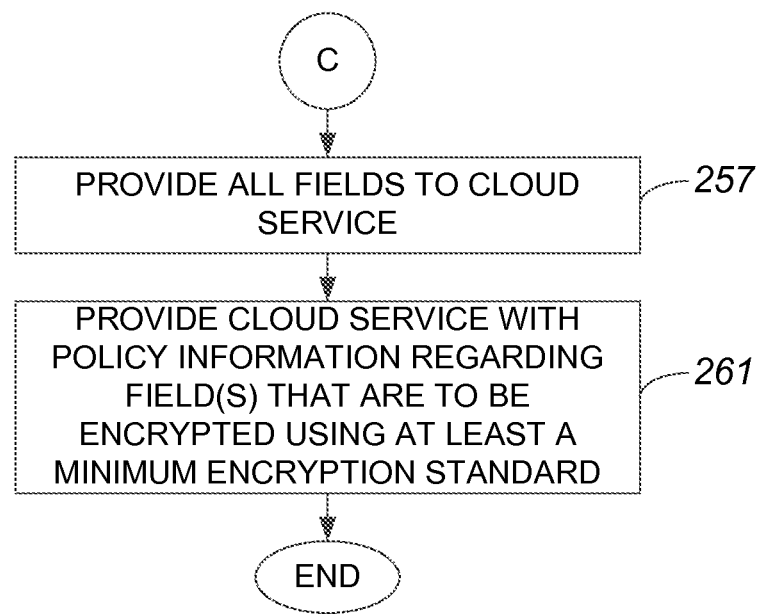

When ascertaining whether cloud service 140 has the capability to encrypt information such as a field, it may be ascertained that cloud service 140 is unable to encrypt the information to a specified level. If cloud service 140 is unable to encrypt the information to a specified level, then gateway 104 may encrypt the information and provide the encrypted information to cloud service 140 for storage. FIG. 1B is a diagrammatic representation of an overall network, e.g., overall network 100 of FIG. 1A, in which a gateway encrypts sensitive fields prior to providing the encrypted sensitive fields to a cloud service for storage in accordance with an embodiment. At a time t1, user device 102 provides information, e.g., a field, to gateway 104 through network 100'. The field, in the described embodiment, is to be stored in an encrypted format by cloud service 140 within the cloud. Upon obtaining the field that is to be encrypted, gateway 104 may cooperate with cloud service 140 to ascertain whether cloud service 140 is capable of encrypting the field to a specified level.

At a time t2, it is determined that cloud service 140 may not encrypt the field to a specified level. Accordingly, at a time t3, gateway 104 encrypts the field to the specified level. After encrypting the field to the specified level, gateway provides the encrypted field to cloud service 140 at a time t4. Upon obtaining the encrypted field, cloud service 140 may cause the encrypted field to be stored.

With reference to FIGS. 2A-D, a method of causing fields obtained by a gateway to be stored by a cloud service in an encrypted format will be described from the point-of-view of the gateway in accordance with an embodiment. A method 201 of causing fields obtained by a gateway to be stored by a cloud service begins at step 205 in which the gateway, i.e., a sending gateway, obtains one or more fields that are to be provided to a cloud service, or a cloud application provider, associated with a cloud. In general, the sending gateway may obtain the one or more fields from a device that is in communication with the sending gateway, e.g., a phone or a computing device.

Once the sending gateway obtains one or more fields to be provided to the cloud service, a determination is made in step 209 as to whether the obtained fields include any sensitive fields. That is, it is determined in step 209 whether any fields obtained by the sending gateway correspond to sensitive information and, thus, are to be encrypted or otherwise coded prior to being stored by the cloud service.

If the determination in step 209 is that there are no sensitive fields, the implication is that the fields may be stored in an unencrypted state. As such, the sending gateway provides the one or more fields to the cloud service in step 213, and the method of causing fields obtained by a gateway to be stored by a cloud service is completed. The cloud service may generally store the one or more fields. It should be appreciated that, in some embodiments, the sending gateway may encrypt the one or more fields for transmission purposes and the cloud service may decrypt the one or fields upon obtaining the one or more fields, and prior to storing the one or more fields.

Returning to step 209, if the determination is that the one or more fields includes at least one sensitive field, then the indication is that at least one field is to be encrypted. As such, process flow proceeds to step 217 in which the sending gateway effectively marks, or otherwise identifies, any sensitive fields for encryption. Optionally, the sending gateway may also define encryption standards. Defining encryption standards may include, but is not limited to including, specifying a desired encryption standard and/or specifying a minimum acceptable encryption standard. Encryption standards may include, but are not limited to including, an Advanced Encryption Standard (AES) and any other suitable cipher. When one or more sensitive fields are marked, each of the sensitive fields may have a different encryption standard or encryption method. For example, the sending gateway may specify that one sensitive field is to be encrypted using AES 512-bit encryption and specify that another sensitive field is to be encrypted using AES 256-bit encryption.

A determination is made in step 221 as to whether the cloud service is capable of storage encryption. If it is determined that the cloud service is capable of storage encryption, then it is determined in step 225 whether the cloud service is capable of providing storage encryption that meets a particular, e.g., desired, encryption standard.

If the determination in step 225 is that the cloud service is capable of meeting a desired encryption standard, the indication is that the cloud service may perform substantially all encryption of the one or more fields as needed for storage purposes. Accordingly, process flow moves to step 249 in which the sending gateway provides the one or more fields to the cloud service. It should be appreciated that both sensitive and non-sensitive fields may be provided to the cloud service, and that substantially all fields may be encrypted for transmission purposes. Encryption for transmission purposes and encryption for storage purposes are generally separate processes. In the described embodiment, policy information that identifies a desired encryption standard to be used to encrypt any sensitive fields for storage purposes may also be provided to the cloud service in step 253. The method of causing fields obtained by a gateway to be stored by a cloud service in an encrypted format is completed once the one or more fields and policy information are provided to the cloud service.

Returning to step 225, if the determination is that the cloud service is not capable of meeting a desired encryption standard, the implication is that the cloud service may meet a minimum encryption standard. As such, the sending gateway provides the one or more fields to the cloud service in step 257. It should be appreciated that both sensitive and non-sensitive fields may be provided to the cloud service. In the described embodiment, policy information that identifies a minimum acceptable encryption standard to be used to encrypt any sensitive fields may also be provided to the cloud service in step 261. The method of causing fields obtained by a gateway to be stored by a cloud service in an encrypted format is completed once the one or more fields and policy information are provided to the cloud service.

Referring back to step 221 and the determination of whether the cloud service is capable of storage encryption, if it is determined that the cloud service is not capable of storage encryption, the process flow moves to step 229 in which the sending gateway encrypts one or more sensitive fields for storage. After encrypting any sensitive fields for storage, the sending gateway provides substantially all fields, e.g., fields are not identified as sensitive and encrypted sensitive fields, to the cloud service, and the method of causing fields obtained by a gateway to be stored by a cloud service in an encrypted format is completed.

Figure 3:
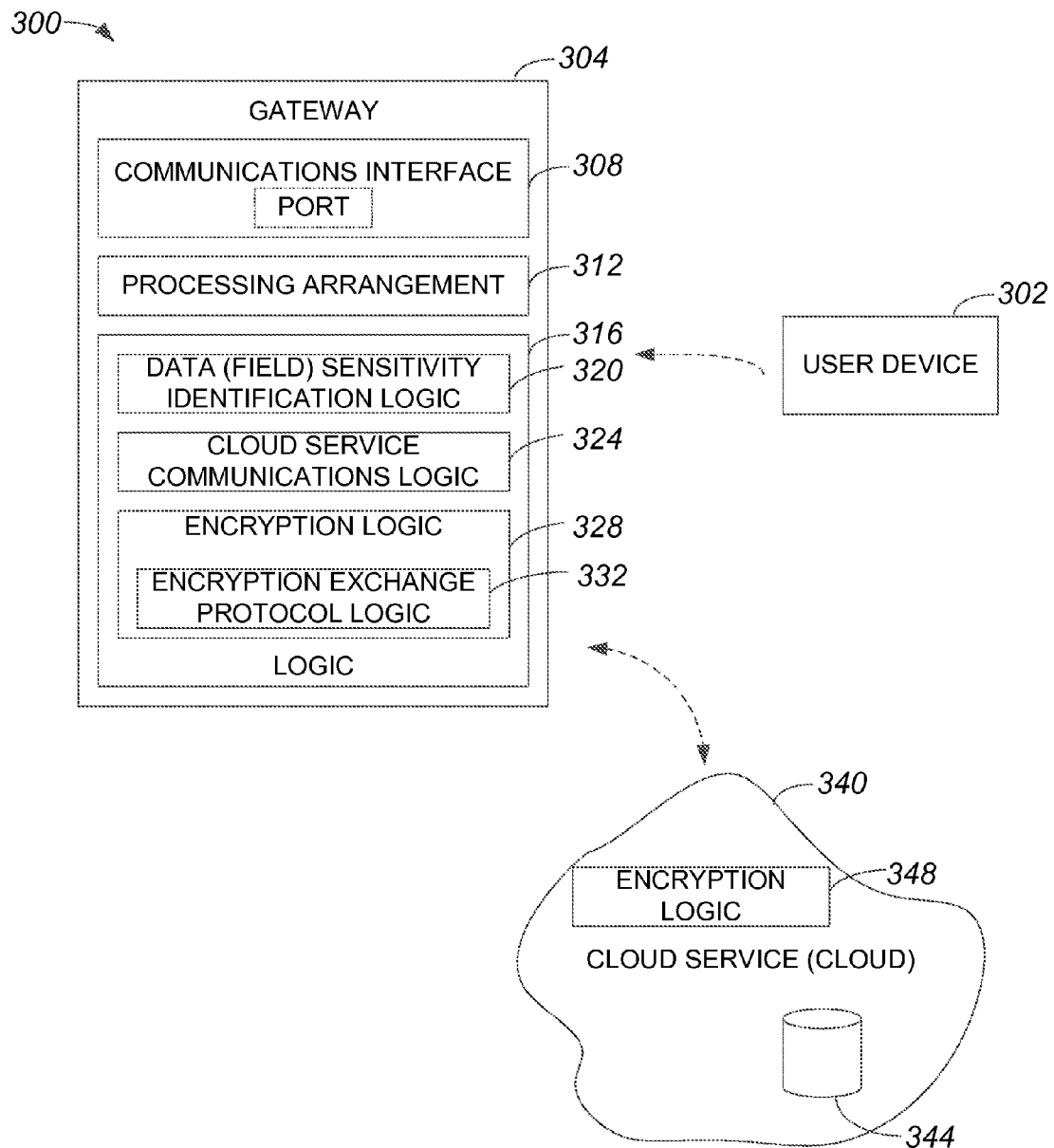
FIG. 3 is a diagrammatic representation of a network that includes a gateway and a cloud with a cloud service arranged to store encrypted fields in accordance with an embodiment.

An overall network in which a gateway may ascertain whether a cloud service or cloud application provider has the capability to encrypt information to a specified level will be described with respect to FIG. 3. FIG. 3 is a diagrammatic representation of an overall network in accordance with an embodiment. An overall network 300 includes a user device 302, a gateway 304, and a cloud service 340. User device 302 may be generally any suitable device which allows a user (not shown) to cause data, e.g., information such as a field associated with a form, to a gateway 304. In one embodiment, user device 302 and gateway 304 may be part of an enterprise. Gateway 304, which may be a server or a router, is arranged to communicate with user device 302 and cloud service 340 within network 300. Cloud service 348, or a cloud application provider, is effectively part of a cloud, or a communications network such as the Internet.

Gateway 304 includes a communications interface 308, a processing arrangement 312, and logic 316. Communications interface 308 may include one or more ports which allow gateway 304 to communicate through overall network 300, as for example with user device 302 and cloud service 340. A processing arrangement 312 may include one or more processors which facilitate the execution of logic 316.

Logic 316, which may include hardware and/or software logic, includes data or field sensitivity identification logic 320, cloud service communications logic 324, and encryption logic 328. Data sensitivity identification logic 320 is configured to identify data obtained by gateway, as for example from user device 302, that is sensitive. In one embodiment, data sensitivity identification logic 320 may also be arranged to identify a level of sensitivity of data. For example, one piece of data may be identified as having a relatively high level of sensitivity, another piece of data may be identified as having a relatively low level of sensitivity, while still another piece of data may be identified as not being sensitive. Cloud service communications logic 324 is configured to enable gateway 304 to communicate with cloud service 340 to determine whether cloud service 340 may encrypt sensitive data and to identify levels of encryption that cloud service 340 may provide. Encryption logic 328 is generally configured to encrypt data for storage, as for example when it is determined that cloud service 340 is unable to encrypt the data, and may encrypt the data at different levels based on the level of sensitivity identified for the data. For example, encryption logic 328 may encrypt data with a relatively high level of sensitivity using an AES 512-bit encryption standard and may encrypt data with a lower level of sensitivity using an AES 256-bit encryption standard. Encryption logic 328 may include encryption exchange protocol logic 332 which may provide an encryption key to cloud service 340 that enables cloud service 340 to decrypt data that has been encrypted for storage by encryption logic 328.

Cloud service 340 includes encryption logic 348, and is associated with a storage medium 344. Encryption logic 348 is configured to encrypt sensitive data obtained from gateway 304, and may communicate with cloud service communications logic 324 to provide gateway 304 with information regarding the encryption capabilities of cloud service 340. Cloud service 340 may cause encrypted data to be stored in storage medium 344.

Figure 4:
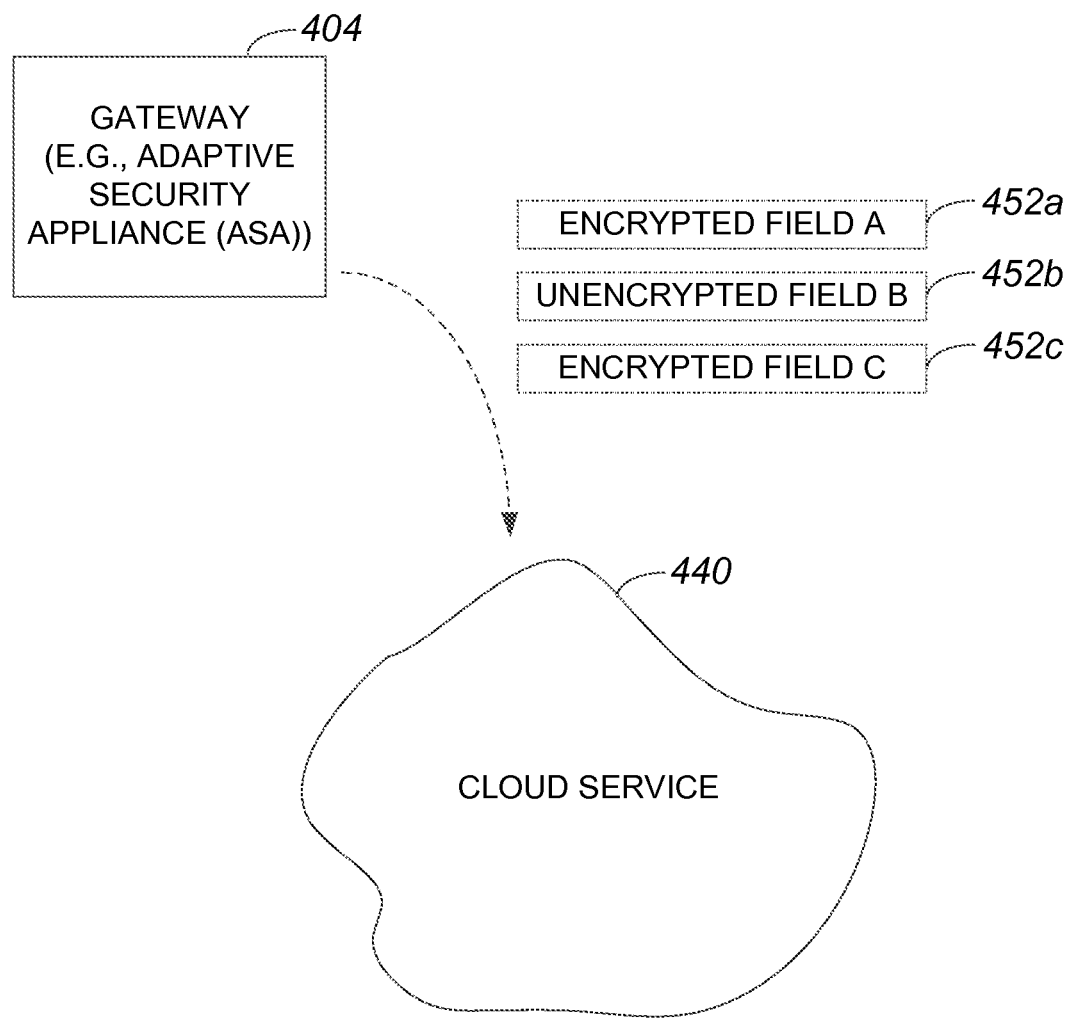
FIG. 4 is a diagrammatic representation of a process of providing encrypted and unencrypted fields to a cloud service for storage in accordance with in embodiment.

When a gateway encrypts data for storage, individual pieces of data or individual fields may be encrypted. That is, rather than an entire set of data or fields being encrypted for storage, some data may be encrypted while other data may remain substantially unencrypted. FIG. 4 is a diagrammatic representation of a process of providing encrypted and unencrypted fields to a cloud service for storage in accordance with in embodiment. When a gateway 404 determines that a cloud service 440 that is to store fields is in not configured to encrypt the fields to an acceptable level, gateway 404 may encrypt fields for storage, and then provide the fields encrypted for storage to cloud service 440. In the described embodiment, gateway 404 may provide an encrypted field "A" 452a and an encrypted field "C" 452c to cloud service 440 for storage in their encrypted forms, and also an unencrypted field "B" 452b to cloud service 440 for storage in its unencrypted form. Encrypted fields 452a, 452c may be separately provided to cloud service 440. By way of example, even in the event that fields 452a-c are all associated with one form or a set of data, fields 452a, 452c may be separately encrypted and provided to cloud service 440. In other words, rather than encrypting an entire form that contains fields 452a-c as a substantially single unit, fields 452a-c are effectively processed separately such that encrypted field "A" 452a, unencrypted field "B" 452b, and encrypted field "C" 452c may be substantially separately provided to cloud service 440.

Figure 5A:
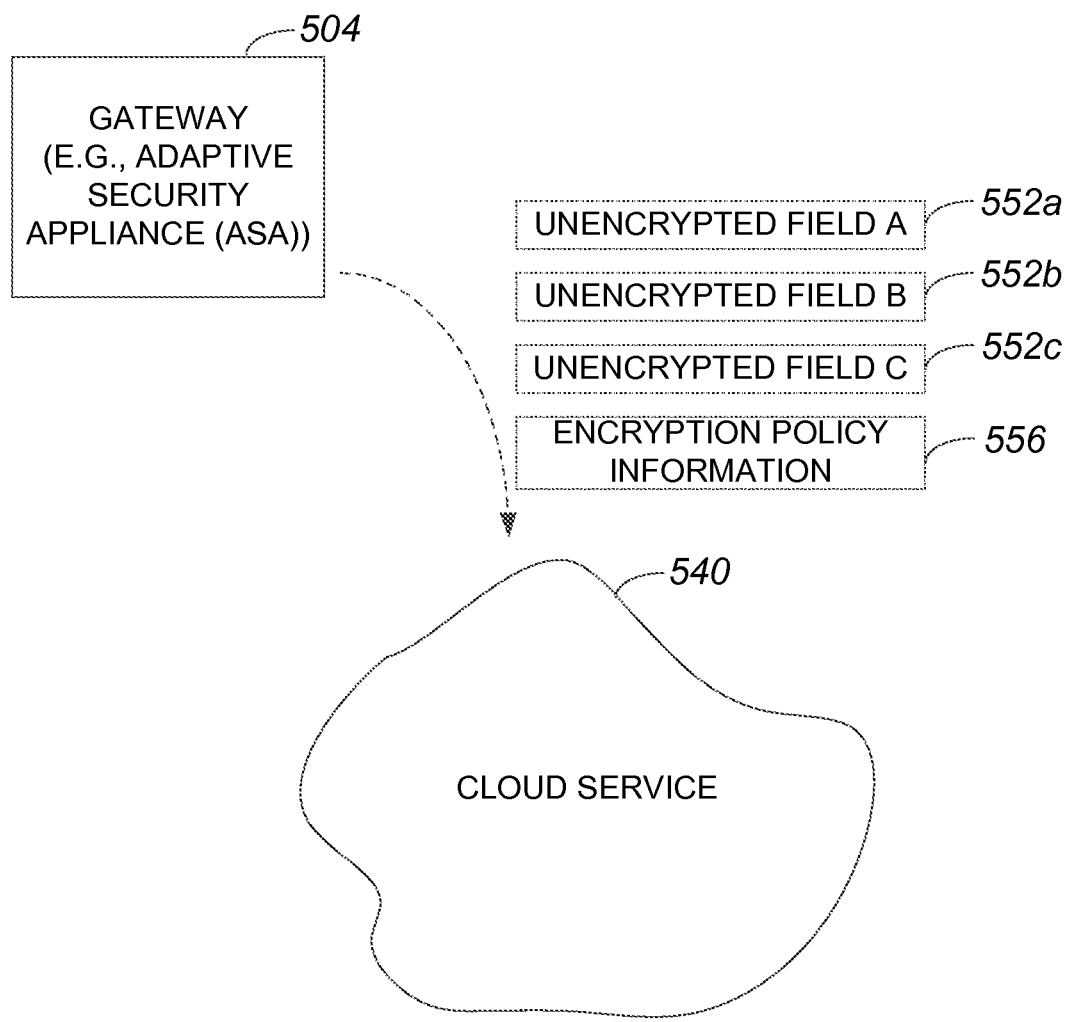
FIG. 5A is a diagrammatic representation of a process of storing fields using a cloud service at a time t1 in which unencrypted fields and encryption information are provided to the cloud service in accordance with an embodiment.
Figure 5B:
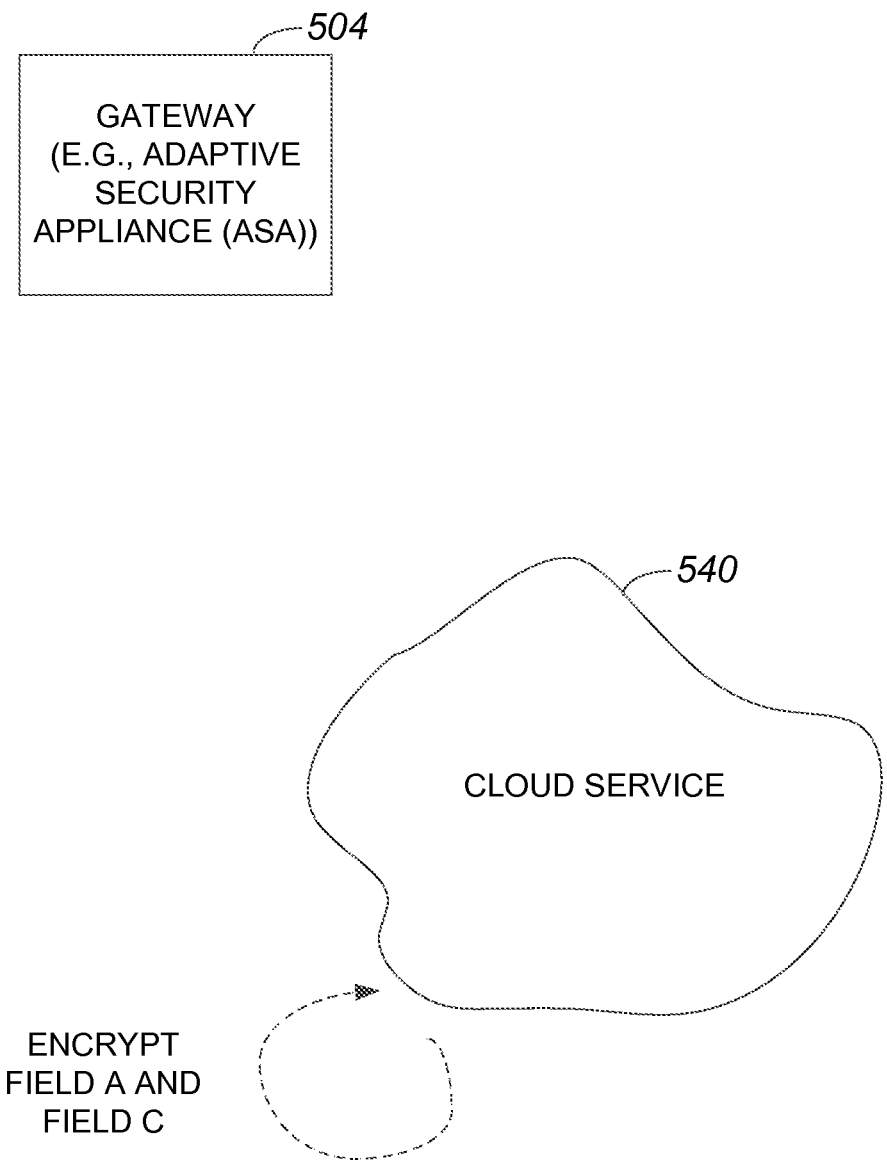
FIG. 5B is a diagrammatic representation of a process of storing fields using a cloud service at a time t2 in which the cloud service encrypts unencrypted fields as needed in accordance with an embodiment.
Figure 5C:
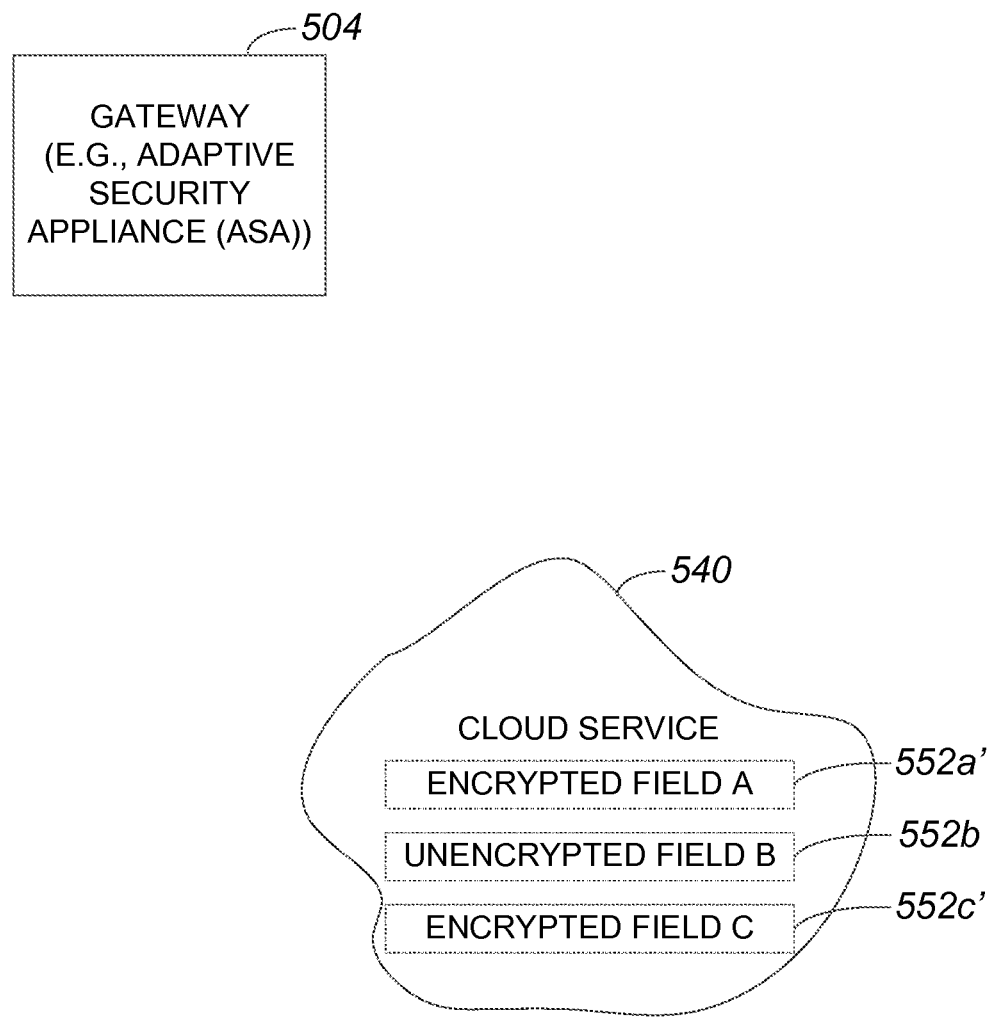
FIG. 5C is a diagrammatic representation of a process of storing fields using a cloud service at a time t3 in which fields on stored by the cloud service in accordance with an embodiment.

With reference to FIGS. 5A-C, a process of storing fields using a cloud service that encrypts the fields prior to storage will be described. FIG. 5A is a diagrammatic representation a process of storing fields using a cloud service at a time t1 in which unencrypted fields and encryption information are provided to the cloud service in accordance with an embodiment. At a time t1, a gateway 504 provides unencrypted fields 552a-c to a cloud service 540. Gateway 504 may also optionally provide encryption policy information 556 to cloud service 540. Encryption policy information 556 may specify, but is not limited to specifying, which fields 552a-c are to be encrypted for storage, a desired level of encryption for each field 552a-c to be encrypted, and/or a minimum acceptable level of encryption for each field 552a-c to be encrypted.

In the described embodiment, unencrypted fields 552a, 552c are to be encrypted by cloud service 540 while field 552b is to be stored in an unencrypted form. At a time t2, as shown in FIG. 5B, cloud service 540 encrypts fields 552a, 552c. At a time t3, as shown in FIG. 5C, after fields 552a, 552c are encrypted such that encrypted fields 552a', 552c' are created, cloud service 540 stores encrypted fields 552a', 552c' and unencrypted field 552b in a cloud.

Figure 6A:
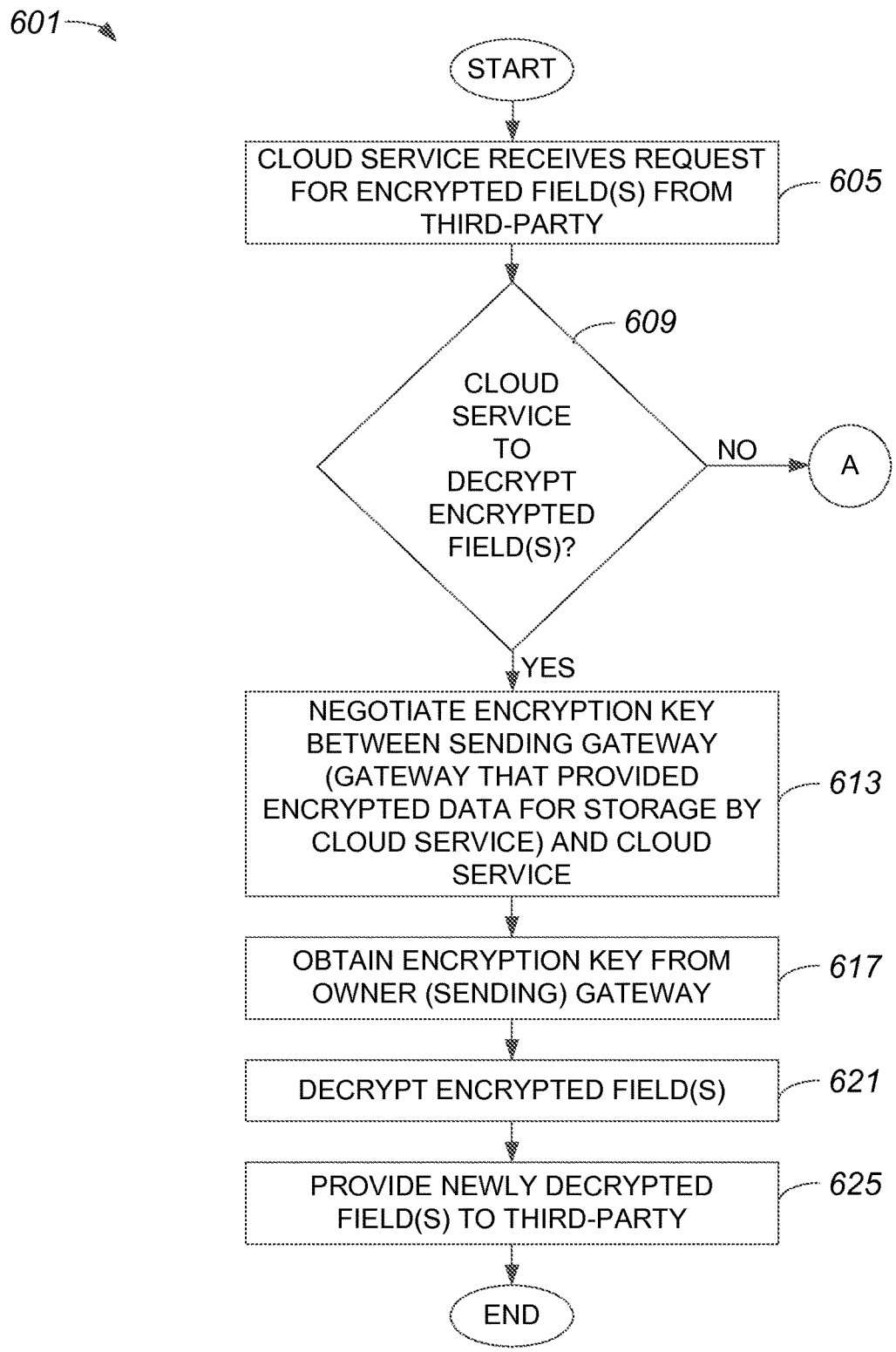
FIGS. 6A and 6B are a process flow diagram which illustrates a method of decrypting encrypted data stored by a cloud service in accordance with an embodiment.
Figure 6B:
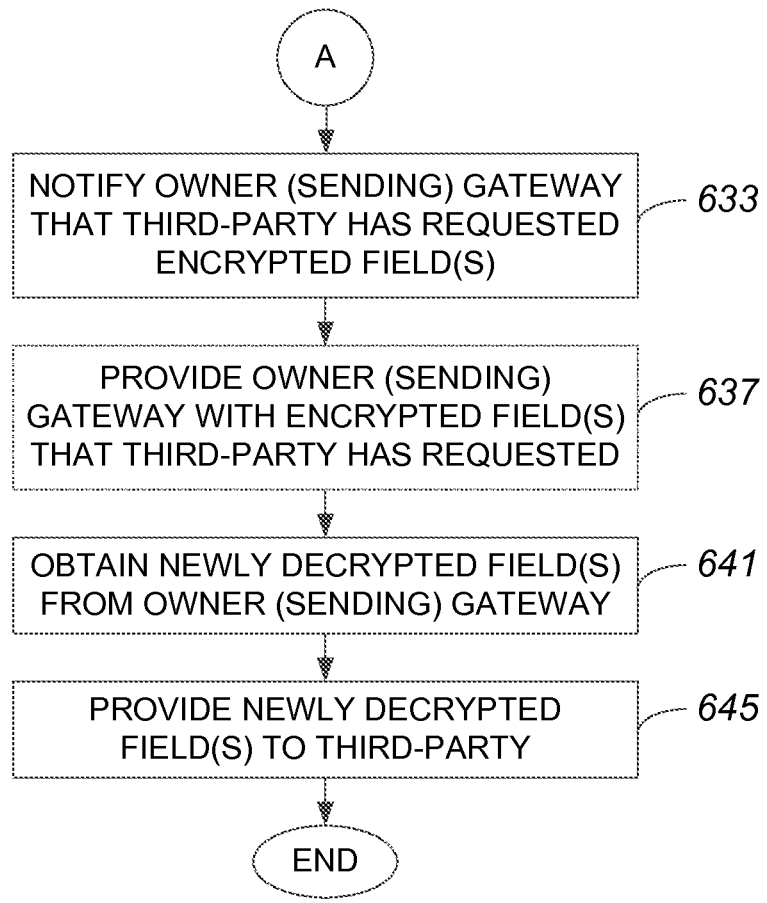

Data stored on a cloud may be requested by an owner of the data, as well as by other interested parties. For example, encrypted data stored on a cloud by a cloud service may be requested by applications and/or users other than the owners or the originators of the data. When a request to gain access to encrypted data stored on a crowd is made by a non-owner of the encrypted data, e.g., by a third-party, the encrypted data is generally decrypted before being provided to the third-party. FIGS. 6A and 6B are a process flow diagram which illustrates a method of decrypting encrypted data stored by a cloud service such that the data may be provided to a third party in accordance with an embodiment. A method 601 of decrypting encrypted data stored on a cloud by a cloud service begins at step 605 in which a cloud service, or a cloud application provider, receives a request for one or more encrypted fields from a third-party. Once the request is received or otherwise obtained, a determination is made in step 609 as to whether the cloud service is to decrypt the one or more encrypted fields. It should be appreciated that either the cloud service may decrypt the one or more encrypted fields, or an owner of the fields, e.g., the sending gateway that provided the encrypted data for storage, may decrypt the one or more encrypted fields.

If it is determined in step 609 that the cloud service is to decrypt the one or more encrypted fields, then the cloud service negotiates with an owner gateway, i.e., the gateway that provided the encrypted data for storage, in step 613 to obtain an encryption key that would enable the cloud service to decrypt the one or more encrypted fields. The cloud service obtains the encryption key from the owner gateway in step 617. It should be appreciated that in some embodiments, as for example embodiments in which asymmetric encryption may be used, decrypting an encrypted field may not involve obtaining an encryption key.

After obtaining the encryption key, the cloud service decrypts the one or more encrypted fields in step 621, and provides the one or more newly decrypted fields to the third-party in step 625. Once the newly decrypted fields are provided to the third-party, the method of decrypting encrypted data stored on a cloud by a cloud service is completed.

Returning to step 609, if it is determined that the cloud service is not to decrypt the one or more encrypted fields requested by the third-party, the implication is that the owner gateway will decrypt the one or more encrypted fields. As such, process flow moves from step 609 to step 633 in which the cloud service notifies the owner gateway that the third-party has requested access to the one or more encrypted fields. In the described embodiment, the cloud service provides the owner gateway with the one or more encrypted fields that the third-party has requested access to in step 637. It should be appreciated, however, that in lieu of providing an owner gateway with the one or more encrypted fields to be decrypted, the cloud service may instead effectively just inform the sending gateway that the sending gateway should decrypt the one or more encrypted fields.

In step 641, the cloud service obtains the one or more newly decrypted fields from the owner gateway, after the owner gateway has decrypted the one or more previously encrypted fields. Upon obtaining the one or more newly decrypted fields, the cloud service provides the one or more newly decrypted fields to the third-party in step 645. Once the newly decrypted fields are provided to the third-party, the method of decrypting encrypted data stored on a cloud by a cloud service is completed.

Although only a few embodiments have been described in this disclosure, it should be understood that the disclosure may be embodied in many other specific forms without departing from the spirit or the scope of the present disclosure. By way of example, while a gateway may interact with a cloud service to determine whether the cloud service is capable of encrypting a particular piece of data or field using a specified level of encryption, a gateway may instead make such a determination substantially without interacting with the gateway. In one embodiment, a gateway may have access to a table or other data structure, e.g., stored on the gateway, which includes information that identifies the encryption capabilities of a cloud service.

While a gateway has been described as being suitable for ascertaining whether a cloud service associated with a cloud is capable of encrypting data for storage, it should be appreciated that a network node that may ascertain whether a cloud service is capable of encrypting data for storage is not limited to being a gateway. In general, any suitable network node may be provided with functionality to ascertain whether a cloud service is capable of encrypting data for storage. Suitable network nodes may include, but are not limited to including, routers, switches, servers, and protocol converters without departing from the spirit or the scope of the disclosure.

Any suitable encryption standards may be used to encrypt sensitive data for storage. In addition, a variety of different criteria may be used to determine a level to which sensitive data is to be encrypted for storage. For instance, the data itself may be used to determine a level to which the data is to be encrypted for storage, e.g., data such as a social security number may be encrypted using a higher level of encryption than data such as an address. In one embodiment, the physical location of a cloud service may be used to determine a level to which sensitive data is to be encrypted for storage. By way of example, data that is to be stored by a cloud service located in a safe zone or area may be encrypted using a lower level of encryption than data that is to be stored by a cloud service located in an unsafe zone or area.

As will be appreciated by those skilled in the art, a gateway may generally encrypt data for transmission through a network, as for example to a cloud service. When a gateway encrypts data for storage prior to providing the encrypted data to a cloud service, the data encrypted for storage may be further encrypted for transmission. Upon receiving or otherwise obtaining the data encrypted for storage and encrypted for transmission, the cloud service may perform decryption to effectively remove the transmission encryption and, thus, effectively obtain the data encrypted for storage.

In one embodiment, if neither a cloud service or a sending gateway is capable of encrypting a piece of data or a field at a desired level of encryption, a notification may be provided to an administrator associated with the sending gateway which indicates that the piece of data may not be encrypted at the desired level of encryption. In such an embodiment, a piece of data that may not be encrypted for storage at a desired level of encryption may be dropped. It should be understood, however, that in lieu of dropping such a piece of data, an administrator may be provided with an ability to elect whether to encrypt such a piece of data at a lower level or encryption or whether to drop such a piece of data.

An overall cloud service, or a set of cloud services, may be associated with a cloud manager that is part of a cloud. A sending gateway may negotiate with the overall cloud service, and the cloud manager may be arranged to manage parts of the cloud, e.g., sub-clouds that are part of the cloud, and to identify a suitable sub-cloud or part of the cloud on which a piece of data obtained by the sending gateway may be stored within the cloud. In other words, a cloud service may be selected over other cloud services based on the encryption capabilities offered by the selected cloud service. For instance, when a particular level of encryption is desired for a piece of data, an a cloud service associated with a particular sub-cloud which is capable of effectively meeting the particular level of encryption may be selected over other cloud services which are not capable of effectively meeting the particular level of encryption.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
providing a request to store at least a first piece of data, the at least first piece of data being included in a set of information, the set of information further including a first piece of information, the request being provided to a cloud application provider, wherein the request to store the at least first piece of data is a request to store the at least first piece of data in a first encrypted form on a cloud associated with the cloud application provider;
determining whether the cloud application provider is capable of encrypting the at least first piece of data;
providing the at least first piece of data to the cloud application provider if it is determined that the cloud application provider is capable of encrypting the at least first piece of data;
encrypting the at least first piece of data to create the first encrypted form if it is determined that the cloud application provider is not capable of encrypting the at least first piece of data;
providing the first encrypted form to the cloud application provider if it is determined that the cloud application provider is not capable of encrypting the at least first piece of data; and
providing the first piece of information to the cloud application provider, the first piece of information being in an unencrypted form;
wherein determining whether the cloud application provider is capable of encrypting the at least first piece of data includes determining whether the cloud application provider is capable of encrypting the at least first piece of data at a first level of encryption,
wherein when it is determined that the cloud application provider is not capable of encrypting the at least first piece of data at the first level of encryption, the method further includes:
determining whether the cloud application provider is capable of encrypting the at least first piece of data at a second level of encryption, the second level of encryption being a minimum encryption standard.

2. The method of claim 1 wherein the at least first piece of data is obtained from a first field associated with a form, wherein the first piece of information is also obtained from the form.

3. The method of claim 1 wherein the request includes a request to store a second piece of data, the second piece of data being included in the set of information, the method further including:
determining whether the cloud application provider is capable of encrypting the second piece of data;
providing the second piece of data to the cloud application provider without encrypting the second piece of data if it is determined that the cloud application provider is capable of encrypting the second piece of data;
encrypting the second piece of data to create a second encrypted form if it is determined that the cloud application provider is not capable of encrypting the second piece of data, the second encrypted form being separate from the first encrypted form; and
providing the second encrypted form to the cloud application provider if it is determined that the cloud application provider is not capable of encrypting the second piece of data.

4. The method of claim 3 wherein determining whether the cloud application provider is capable of encrypting the at least first piece of data includes determining whether the cloud application provider is capable of encrypting the at least first piece of data at a third level of encryption, and wherein determining whether the cloud application provider is capable of encrypting the second piece of data includes determining whether the cloud application provider is capable of encrypting the second piece of data at a fourth level of encryption, the third level of encryption being different from the fourth level of encryption.

5. The method of claim 1 wherein if it is determined that the cloud application provider is capable of encrypting the at least first piece of data at the first level of encryption, the method further includes:
providing an indication to the cloud application provider, the indication being arranged to indicate that the cloud application provider is to encrypt the at least first piece of data at the first level of encryption.

6. The method of claim 1 wherein the set of information is included in a web form, the at least first piece of data is included in a first field of the web form, and the first piece of information is included in a second field of the web form.

7. A tangible, non-transitory computer-readable medium comprising computer program code, the computer program code, when executed, configured to:
provide a request to store at least a first piece of data, the at least first piece of data being included in a set of information, the set of information further including a first piece of information, the request being provided to a cloud application provider, wherein the request to store the at least first piece of data is a request to store the at least first piece of data in a first encrypted form on a cloud associated with the cloud application provider;
determine whether the cloud application provider is capable of encrypting the at least first piece of data;
provide the at least first piece of data to the cloud application provider if it is determined that the cloud application provider is capable of encrypting the at least first piece of data;
encrypt the at least first piece of data to create the first encrypted form if it is determined that the cloud application provider is not capable of encrypting the at least first piece of data;
provide the first encrypted form to the cloud application provider if it is determined that the cloud application provider is not capable of encrypting the at least first piece of data; and
providing the first piece of information to the cloud application provider, the first piece of information being in an unencrypted form;
wherein the computer program code configured to determine whether the cloud application provider is capable of encrypting the at least first piece of data is configured to determine whether the cloud application provider is capable of encrypting the at least first piece of data at a first level of encryption,
wherein when it is determined that the cloud application provider is not capable of encrypting the at least first piece of data at the first level of encryption, the computer program code is further configured to determine whether the cloud application provider is capable of encrypting the at least first piece of data at a second level of encryption, the second level of encryption being a minimum encryption standard.

8. The tangible, non-transitory computer-readable medium of claim 7 wherein the at least first piece of data is obtained from a first field associated with a web form, wherein the first piece of information is obtained from a second field associated the web form.

9. The tangible, non-transitory computer-readable medium of claim 7 wherein the request includes a request to store a second piece of data, the second piece of data being included in the set of information, and wherein the computer program code is further comprised to:
determine whether the cloud application provider is capable of encrypting the second piece of data;
provide the second piece of data to the cloud application provider if it is determined that the cloud application provider is capable of encrypting the second piece of data;
encrypt the second piece of data to create the second encrypted form if it is determined that the cloud application provider is not capable of encrypting the second piece of data, the second encrypted form being separate from the first encrypted form; and
provide the second encrypted form to the cloud application provider if it is determined that the cloud application provider is not capable of encrypting the second piece of data.

10. The tangible, non-transitory computer-readable medium of claim 9 wherein the computer program code configured to determine whether the cloud application provider is capable of encrypting the at least first piece of data is configured to determine whether the cloud application provider is capable of encrypting the at least first piece of data at a third level of encryption, and wherein the computer program code configured to determine whether the cloud application provider is capable of encrypting the second piece of data is configured to determine whether the cloud application provider is capable of encrypting the second piece of data at a fourth level of encryption, the third level of encryption being different from the fourth level of encryption.

11. The tangible, non-transitory computer-readable medium of claim 7 wherein if it is determined that the cloud application provider is capable of encrypting the at least first piece of data at the first level of encryption, the computer program code is further configured to:
provide an indication to the cloud application provider, the indication being arranged to indicate that the at least first piece of data is to be encrypted at the first level of encryption.

12. The tangible non-transitory computer-readable medium of claim 7 wherein the tangible non-transitory computer-readable medium is embodied on a gateway.

13. An apparatus comprising:
a communications interface, the communications interface configured to enable network communications with a cloud application provider;
a hardware processing arrangement; and
logic embodied on a tangible, non-transitory computer-readable medium, the logic configured to be executed by the hardware processing arrangement, wherein the logic includes communications logic and encryption logic,
the communications logic being configured to determine whether the cloud application provider is capable of encrypting a first piece of data included in a set of information that also includes a first piece of information, and configured to provide the first piece of data to the cloud application provider when it is determined that the cloud application provider is capable of encrypting the first piece of data, the encryption logic being configured to encrypt the first piece of data to form a first encrypted piece of data when it is determined that the cloud application provider is not capable of encrypting the first piece of data, and wherein the communications logic is further configured to provide the first encrypted piece of data to the cloud application provider and to provide the first piece of information to the cloud application provider in an unencrypted form;

wherein determining whether the cloud application provider is capable of encrypting the first piece of data includes determining whether the cloud application provider is capable of encrypting the first piece of data at a first level of encryption, wherein when it is determined that the cloud application provider is not capable of encrypting the first piece of data at the first level of encryption, determining whether the cloud application provider is capable of encrypting the first piece of data at a second level of encryption, the second level of encryption being a minimum encryption standard.

14. The apparatus of claim 13 wherein the logic further includes field sensitivity identification logic, the field sensitivity identification logic being configured to identify the first piece of data as needing encryption.

15. The apparatus of claim 14 wherein the communications logic is further configured to determine whether the cloud application provider is capable of encrypting a second piece of data included in the set of information and configured to provide the second piece of data to the cloud application provider when it is determined that the cloud application provider is capable of encrypting the second piece of data, wherein the encryption logic is further configured to encrypt the second piece of data to form a second encrypted piece of data when it is determined that the cloud application provider is not capable of encrypting the second piece of data and wherein the communications logic is further configured to provide the second encrypted piece of data to the cloud application provider.

16. The apparatus of claim 15 wherein the communications logic configured to determine whether the cloud application provider is capable of encrypting the first piece of data is configured to determine whether the cloud application provider is capable of encrypting the first piece of data at a third level of encryption, and wherein the communications logic configured to determine whether the cloud application provider is capable of encrypting the second piece of data is configured to determine whether the cloud application provider is capable of encrypting the second piece of data at a fourth level of encryption, the fourth level of encryption being different from the third level of encryption.

17. The apparatus of claim 13 wherein the apparatus is a gateway.

18. The apparatus of claim 17 wherein the communications interface is further configured to communicate with a user device, and wherein the communications interface is configured to obtain the first piece of data from a field of a web form through the user device.

19. The apparatus of claim 13 wherein the first piece of data is associated with a field in a form, and wherein the first piece of information is also associated with the form.

20. A method comprising:
providing a request to store a set of information, the set of information including a first piece of data and a second set of data, the first piece of data being sensitive, the second piece of data being not sensitive, the request being provided from a gateway to a cloud application provider, wherein the request to store the set of information includes a request to store the first piece of data in a first encrypted form on a cloud associated with the cloud application provider;
determining whether the cloud application provider is capable of encrypting the first piece of data to a first level of encryption;
providing the a first piece of data from the gateway to the cloud application provider if it is determined that the cloud application provider is capable of encrypting the first piece of data to the first level of encryption;
encrypting the first piece of data at the gateway to create the first encrypted form if it is determined that the cloud application provider is not capable of encrypting the first piece of data to the first level of encryption;
providing the first encrypted form to the cloud application provider if it is determined that the cloud application provider is not capable of encrypting the first piece of data to the first level of encryption; and
providing the second piece of data to the cloud application provider, the second piece of data being in an unencrypted form;
wherein when it is determined that the cloud application provider is not capable of encrypting the first piece of data to the first level of encryption, determining whether the cloud application provider is capable of encrypting the first piece of data to a second level of encryption, the second level of encryption being a minimum encryption standard.

* * * * *